3,408,580
OSCILLOSCOPE DEVICE EXHIBITING
REDUCED JITTER
Hiro Moriyasu, Beaverton, Oreg., assignor to Tektronix,
Inc., Beaverton, Oreg., a corporation of Oregon
Filed Mar. 17, 1966, Ser. No. 535,211
11 Claims. (Cl. 328—185)

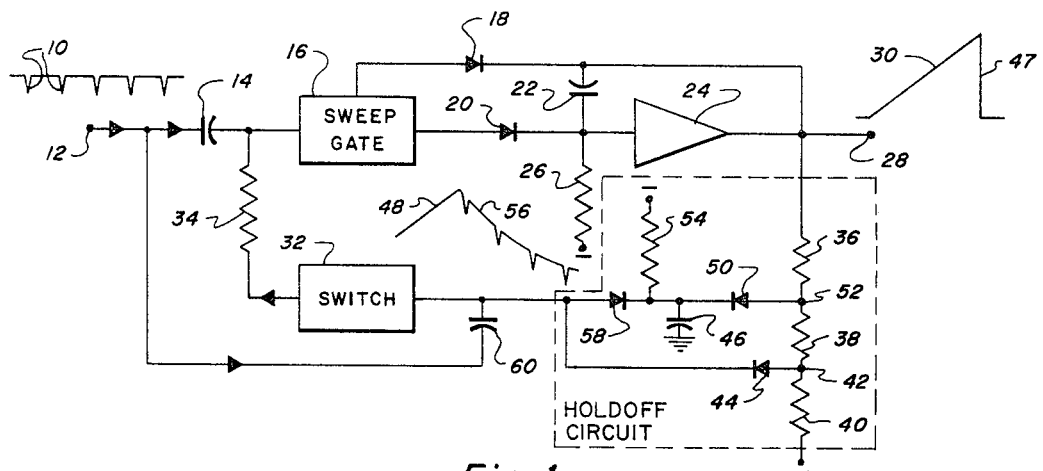
Fig. 1
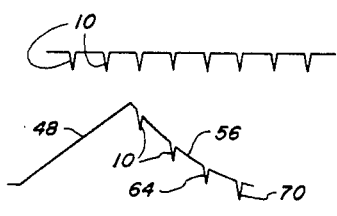
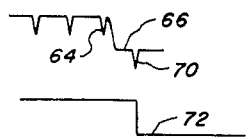
Fig. 2
HIRO MORIYASU
INVENTOR
BY
BUCKHORN, BLORE, KLARQUIST & SPARKMAN
ATTORNEYS United States Patent Office 3,408,580
Patented Oct. 29, 1968

ABSTRACT OF THE DISCLOSURE

An oscilloscope device, including a horizontal sweep generator, is provided with a holdoff circuit for developing a sweep holdoff signal at the end of each horizontal sweep waveform. Repetitive sweep triggering signals derived from repetitive input signals are coupled for initiating operation of the sweep generator, and are also coupled to a control means or switch operated by triggering signals and the holdoff signal. This control means inhibits operation of the sweep generator until such time as the said control means responds conjointly to a triggering signal and a predetermined level of holdoff signal for enabling operation of the sweep generator. The sweep generator will then not be triggered in response to the same triggering signal that operated the control means, but will be enabled to respond stably to the next triggering signal whereby jitter in generation of the horizontal sweep is avoided. Desirably the control means is responsive to a higher value of the hold off signal so as to be switched by the holdoff signal alone after a more extended period of time. In this manner, the oscilloscope is rendered more fully responsive to low repetition rate signals.

---

This invention relates to an oscilloscope device and particularly to a circuit for such a device which is effective for alleviating display jitter.

In an oscilloscope device for portraying a repetitive waveform, the term jitter refers to the movement of the portrayed waveform as triggering of the horizontal sweep is inaccurately accomplished. In most oscilloscope devices, a triggering signal is derived from the repetitive input waveform for application to the device's sweep generator. This triggering signal causes the sweep generator to produce the horizontal time base, for example, the movement of an electron beam from the left side to the right side of a cathode ray tube screen. The horizontal sweep is successively triggered in a correct relation to each repetition of the input waveform such that the portrayed waveform appears in substantially the same place on a cathode ray tube screen for each successive trace. However, if the sweep generator does not initiate its sweep output for application to the horizontal deflection apparatus in accurately timed relation with successive triggering signals, jitter or movement of the portrayed waveform is likely to result.

After each sweep waveform is generated by a sweep generator, the sweep generator must recover before another sweep waveform is generated. For this purpose, the horizontal sweep system is appropriately provided with a holdoff circuit which disables the sweep generator until the latter is capable of providing an accurate sweep waveform. The holdoff circuit usually produces a relatively slowly changing, e.g. declining, voltage at the conclusion of a sweep waveform output and this changing voltage is conventionally used to inhibit the sweep generator. Both the holdoff voltage and triggering signals are applied to the sweep generator in an opposing sense. When the holdoff waveform declines sufficiently, triggering signals may once again initiate a horizontal sweep.

A principal source of jitter occurs when a triggering signal is received while the holdoff signal is almost, but not quite, recovered. As a result the triggering signal may or may not cause the production of a sweep output at a desired time. Furthermore, since both the holdoff signal and the triggering signal are applied as opposing inputs to the sweep generator, different portions of a triggering signal may cause the initiation of a sweep output depending upon the variable value of the holdoff signal present at the time triggering is finally accomplished.

It is therefore an object of the present invention to provide an improved oscilloscope device exhibiting substantially reduced jitter in its portrayed waveform.

Another object of the present invention is to provide an improved horizontal sweep circuit for an oscilloscope device wherein the jitter caused by coincidence of a triggering input signal with a varying holdoff waveform is substantially alleviated.

It is a further object of the present invention to provide an improved horizontal sweep circuit for an oscilloscope device which operates in one mode for low frequency or low repetition rate signals and a second or jitter reducing mode for high frequency or high repetition rate signals likely to cause jitter in the oscilloscope device.

Briefly, in accordance with an embodiment of the present invention, a horizontal sweep circuit, including a sweep generator and a holdoff circuit, is provided with a switch functioning to selectively enable or disable the sweep generator. The switch operates to enable the sweep generator when the combination of a holdoff signal and a triggering input signal reaches a predetermined level. This switch then renders the sweep generator responsive to a next subsequent triggering input signal. The sweep generator is triggered by the combination of the next triggering signal and a definite voltage level, i.e. the output of the aforementioned switch and therefore definite and positive triggering without jitter can result.

According to an additional feature of the present invention, the switch which enables the reception of triggering input signals by the sweep generator is operable in response to the holdoff signal alone for a low repetition rate signal. However, as the repetition rate of the input signal and therefore the repetition rate of the triggering signal increases to the point where jitter is likely to take place, operation is automatically initiated whereby a first triggering signal in cooperation with the holdoff signal operates the switch to enable the trigger generator so that it is responsive to a subsequent triggering signal.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with accompanying drawings wherein like reference characters refer to like elements and in which:

FIG. 1 is a schematic diagram of an embodiment of the present invention, and

FIG. 2 is a chart of waveforms illustrating operation of the FIG. 1 embodiment.

An oscilloscope device according to the present invention includes a horizontal sweep circuit providing an output signal causing horizontal time base deflection in the oscilloscope display. A conventional oscilloscope which portrays repetitive input signal waveforms includes means for deriving triggering signals from repetitive input signal waveforms and these repetitive triggering signals are employed for initiating horizontal deflection by means of the horizontal sweep circuit. Referring to FIG. 1, a train of repetitive negative going triggering signals 10 are herein applied to terminal 12 and from there through coupling capacitor 14 to the input of the sweep gate 16.

Before triggering, sweep gate 16 in FIG. 1 provides a positive voltage at the anodes of diodes 18 and 20. The cathodes of these diodes are connected respectively to either side of a capacitor 22, and these diodes normally maintain the capacitor 22 in a discharged condition.

When sweep gate 16 is triggered, a negative voltage is applied to the anodes of diodes 18 and 20 by gate 16 and capacitor 22 charges forming a linear ramp output at terminal 28 as indicated by waveform 30. It is this ramp that provides the linear horizontal sweep time base for the oscilloscope device. At triggering and during the production of a ramp waveform, an enabling switch 32 coupled to the input of sweep gate 16 via summing resistor 34, is in a negative or "on" condition for thus enabling the triggered operation of sweep gate 16. This switch 32 is suitably a square wave generator, for example a Schmitt trigger circuit, providing a square wave output in response to variations in voltage level at its input.

The capacitor 22 forms the feedback path for an operational type amplifier 24 which is also provided with an input resistor 26 coupled to a negative source of input voltage. This circuit is termed a Miller integrator and has the attribute of providing a constant charging current for capacitor 22 and therefore provides a linear ramp waveform.

The ramp waveform 30 is also applied to a voltage divider comprising resistors 36, 38 and 40 connected between output terminal 28 and a negative voltage source. Point 42 between resistors 38 and 40 is coupled as an input of switch 32 by way of a diode 44, the latter having its anode connected to point 42 and its cathode connected to switch 32. At the conclusion of ramp waveform 30, that is, when ramp waveform 30 reaches a predetermined peak value, the voltage at point 42 causes diode 44 to conduct and reverts switch 32 to a normally "off" condition. When switch 32 thus turns off, it provides a positive output at the input of sweep gate 16 which causes the anodes of diodes 18 and 20 to become positive. Capacitor 22 is thereby discharged and the ramp waveform is terminated with a relatively sharp trailing edge at 47.

Now it is desired that the sweep generator, which comprises the Miller integrator, sweep gate 16 and interconnecting diodes 18 and 20, remain untriggered for a period of time after the generation of a sweep output. The ramp output voltage should have time to fall entirely to its quiescent value before another sweep is generated, and furthermore, any transients in the system, caused by the rapid conclusion of the ramp waveform, should have ample time to die out. Therefore, switch 32 is maintained in an "off" condition, providing a positive disabling output at the input of sweep gate 16, for a period of time after the conclusion of the ramp signal. For this purpose, the sweep system includes a holdoff circuit, the principal element of which is holdoff capacitor 46. When capacitor 22 is charging for the production of ramp waveform 30, capacitor 46 charges similarly as indicated by waveform portion 48 in the drawing. Capacitor 46 is charged through diode 50 which has its anode connected to point 52 between resistors 36 and 38 and its cathode connected to one terminal of capacitor 46, with the opposite terminal of capacitor 46 grounded. At the conclusion 47 of the ramp waveform the voltage across capacitor 46 does not drop sharply because the difference in voltage across diode 50 disconnects the latter. Therefore, the holdoff capacitor 46 discharges more slowly through resistor 54 which couples the holdoff capacitor 46 to a source of negative voltage. This discharge is indicated by waveform portion 56 in the drawing. At the beginning of this time it should be noted that diode 58 having its anode connected to the input of switch 32 and its cathode connected to capacitor 46, is non-conducting since the voltage on the holdoff capacitor will be positive with respect to the input of switch 32. However, when the capacitor 46 discharges sufficiently, diode 58 conducts and an input threshold of switch 32 can be exceeded such that switch 32 now changes to its "on" condition and provides a negative going output.

According to the present invention, the switch 32 receives two inputs, one comprising the holdoff signal from capacitor 46, and also the series of trigger input signals 10 coupled to switch 32 by means of capacitor 60. The triggering signals are in effect superimposed upon the declining portion 56 of the holdoff waveform. The manner in which the circuit now operates is more clearly visualized from consideration of the FIG. 2 waveform chart.

In the FIG. 2 waveform chart, the switch 32 output in its "off" condition is illustrated at 62. Now, as trigger input signals 10 in effect add to the concluding portion 56 of a holdoff signal, a triggering signal 64 is reached which is effective, when added to portion 56 of the holdoff signal, to operate switch 32 and place it in an "on" condition. This condition is indicated at 66 on the waveform chart, and, furthermore, it is noted that a finite period of time is taken for the switch 32 to switch from one condition to the other. The switching ramp is indicated at 68 and the switching time involved is longer than the duration of a triggering signal 10. The switch 32 in effect comprises a delay means, or is arranged to include means for delaying its operation, during the period of a triggering signal 10. Triggering signal 64 thus does not initiate generation of a ramp output since it does not operate sweep gate 16 but merely acts to change the condition of switch 32 in cooperation with the holdoff signal. Now, however, switch 32 fully enables operation of sweep gate 16 via resistor 34 so that the next triggering signal in sequence, i.e. triggering signal 70, is effective for operating sweep gate 16 and initiating a ramp waveform output. The second trigger signal 70 is shown superimposed upon the output of switch 32 at 66 and is effective to initiate the negative output condition of sweep gate 16, indicated at voltage level 72. Therefore, capacitor 22 is allowed to charge providing output waveform 30.

It is noted triggering signal 70 is effective in combination with the predetermined voltage level output 66 of switch 32 in its "on" condition for stably and positively initiating the generation of a sweep ramp at a time coinciding with trigger input signal 70. Moreover, since switch 32 provides a definite voltage level 66, triggering will be initiated by the same portion of the input triggering signal waveform in each instance when triggering takes place. Therefore, the sweep waveform will be initiated in definite timed relation to the triggering signal, and jitter is correspondingly alleviated.

According to an additional feature of the present invention, operation of sweep gate 16 is enabled either by the coincidence of the holdoff waveform and a trigger signal through operation of switch 32, or if a triggering signal does not occur when the holdoff waveform voltage falls to a given range level, the holdoff waveform is itself effective to operate switch 32. This takes place as the holdoff waveform portion 56 reaches a low enough level such that the addition of a triggering signal is not required to operate switch 32. Thus, for low repetition rate signals, the signal holdoff "recovers" without waiting for a trigger, and therefore two trigger pulses are not then required. However, in the case of a high repetition rate signal, for which jitter is more likely to occur, switch 32 will be operated by the combination of holdoff signal and a first triggering signal, enabling sweep gate 16 to initiate sweep upon receiving a subsequent triggering signal.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. An oscilloscope device for portraying repetitive input signals and including means for deriving a train of sweep triggering signals from said repetitive input signals wherein each successive triggering signal represents the next successive occurrence of the said input signal, said oscilloscope device comprising:
   generating means for developing a ramp signal for establishing a horizontal sweep in said oscilloscope device,
   coupling means for applying triggering signals for initiating operation of said generating means,
   means for forming a holdoff signal in response to said ramp signal in timed relation with said ramp signal, and
   control means operated conjointly by the combination of a predetermined level of holdoff signal and a triggering signal corresponding to a given occurrence of said input signal, said control means providing in response to said combination a substantially constant value output coupled for enabling said generating means to operate in response to a subsequently occurring triggering signal as applied by said coupling means.

2. The oscilloscope device according to claim 1 wherein said control means comprises triggerable means for responding to a triggering signal in combination with said predetermined level of holdoff signal, and for also responding to a second level of holdoff signal in the absence of a triggering signal, for the purpose of accommodating low repetition rate signals.

3. An oscilloscope device for portraying repetitive input signals and including means for deriving a series of repetitive sweep triggering signals from said repetitive input signals, said oscilloscope device comprising:
   generating means for developing ramp signals for establishing the horizontal sweep in said oscilloscope device,
   coupling means for applying triggering signals for initiating operation of said generating means,
   holdoff means for providing a holdoff signal in response to the conclusion of a horizontal sweep, said holdoff signal having a value which varies with time defining a ramp, and
   control means operated conjointly by the combination of a predetermined level of holdoff signal on the ramp thereof and a triggering signal corresponding to an occurrence of said input signal, said control means providing in response to said combination a voltage level output coupled for enabling said generating means to operate in response to a subsequently occurring triggering signal.

4. The oscilloscope device according to claim 3 wherein said control means comprises a square-wave generator.

5. The oscilloscope device according to claim 3 wherein said control means comprises triggerable means for responding to a triggering signal in combination with said predetermined level of holdoff signal, and for also responding to a second level of holdoff signal in the absence of a triggering signal, for the purpose of accommodating low repetition rate signals.

6. An oscilloscope device for portraying repetitive input signals and including means for deriving a series of repetitive sweep triggering signals from said repetitive input signals, said oscilloscope device comprising:
   generating means for developing first ramp signals in response to repetitive triggering signals for establishing the horizontal sweep in said oscilloscope device,
   means for developing second ramp signals at the conclusion of said first ramp signals, and
   control means for disabling the operation of said generating means and for operating near the conclusion of a second ramp signal in response to said second ramp signal and conjointly in response to a first triggering signal for rendering the said generating means responsive to the next occurring triggering signal of said series of repetitive sweep triggering signals so that the generating means stably initiates a first ramp signal in timed relation with said next triggering signal.

7. The oscilloscope device according to claim 6 wherein said control means is characterized by a delay for operating subsequent to the conclusion of a first triggering signal.

8. An oscilloscope device including a sweep circuit, said sweep circuit comprising:
   a Miller integrator for generating a ramp output sweep waveform,
   a sweep gate for initiating operation of said Miller integrator,
   a holdoff storage circuit responsive to the ramp output of said Miller integrator for storing a voltage for a predetermined time after the conclusion of a ramp output from said Miller integrator, which voltage gradually changes after the conclusion of said ramp output,
   a switching means having first and second states coupled to said sweep gate for normally disabling said sweep gate in a first state thereof,
   means for coupling input triggering signals to said sweep gate and said switching means, and
   means for coupling an output of said holdoff storage circuit to said switching means,
   said switching means comprising means for responding to the voltage of said holdoff storage circuit alone when it reaches a given value to change the state of said switching means to a second state for enabling the triggering of said sweep gate at the occurrence of a triggering signal and for also responding to the combination of an earlier and smaller value of holdoff voltage in combination with a first occurring triggering signal to change the state of the switching means to a second state for enabling the triggering of said sweep gate by a subsequently occurring triggering signal.

9. The oscilloscope device according to claim 8 wherein said holdoff storage circuit includes a storage capacitor.

10. The oscilloscope device according to claim 8 wherein said switching means comprises means for responding to the voltage of said holdoff storage circuit alone when it reaches a given value to change the state of said switching means to a second state for enabling the triggering of said sweep gate at the occurrence of a triggering signal and for also responding to the amplitude addition of an earlier and smaller value of holdoff voltage in combination with a first occurring triggering signal to change the state of the switching means to a second state for enabling the triggering of said sweep gate by a subsequently occurring triggering signal, said amplitude addition being equivalent to said given value.

11. An oscilloscope device for portraying repetitive input signals and including means for deriving repetitive sweep triggering signals from said repetitive input signals, said oscilloscope device comprising:

generating means for developing ramp signals in response to repetitive triggering signals for establishing the horizontal sweep in said oscilloscope device and for generating a holdoff signal, and delay means operative after the conclusion of a horizontal sweep in response to a portion of said holdoff signal and in response to a first triggering signal to enable operation of said generating means, said delay means having a delay in operation thereof at least approximately equal to the duration of said first triggering signal so that said generating means is not responsive to said first triggering signal but is responsive to a subsequent triggering signal.

References Cited
UNITED STATES PATENTS

| | | | |
|---|---|---|---|
| 3,122,652 | 2/1964 | Kobbe et al. | 307—88.5 |
| 3,132,261 | 5/1964 | Weber | 307—88.5 |
| 3,313,955 | 4/1967 | Des Brisay | 307—88.5 |

JOHN S. HEYMAN, *Primary Examiner.*